(12) United States Patent
Takizawa et al.

(10) Patent No.: US 7,666,924 B2
(45) Date of Patent: Feb. 23, 2010

(54) POLYMERIC DISPERSANTS

(75) Inventors: Nobuyuki Takizawa, Wakayama (JP); Shigeki Nagashima, Wakayama (JP); Takehiro Tsutsumi, Osaka (JP)

(73) Assignee: KAO Corporation, Tokyo (JP)

( * ) Notice: Subject to any disclaimer, the term of this patent is extended or adjusted under 35 U.S.C. 154(b) by 609 days.

(21) Appl. No.: 11/149,262

(22) Filed: Jun. 10, 2005

(65) Prior Publication Data

US 2005/0282932 A1 Dec. 22, 2005

(30) Foreign Application Priority Data

Jun. 10, 2004 (JP) ............................. 2004-172282

(51) Int. Cl.
*B41J 2/01* (2006.01)
*B41J 2/17* (2006.01)
*C04B 35/634* (2006.01)
*C08F 290/06* (2006.01)
*C08J 3/00* (2006.01)
*C08K 5/5333* (2006.01)
*C08L 31/00* (2006.01)
*C08L 33/00* (2006.01)
*C08L 33/06* (2006.01)
*C08L 43/00* (2006.01)
*C09B 67/00* (2006.01)
*C09D 1/00* (2006.01)
*C09D 4/00* (2006.01)
*C09D 5/00* (2006.01)
*C09D 11/00* (2006.01)
*C09K 3/00* (2006.01)
*G01D 11/00* (2006.01)

(52) U.S. Cl. ................. 523/160; 106/31.01; 106/31.13; 106/31.25; 106/31.27; 106/31.6; 106/31.65; 347/1; 347/84; 347/95; 347/100; 523/161; 524/558; 524/560; 524/561; 524/807

(58) Field of Classification Search .................... 347/1, 347/84, 95, 100; 523/160, 161; 524/558, 524/560, 561, 807; 106/31.01, 31.13, 31.25, 106/31.27, 31.6, 31.65

See application file for complete search history.

(56) References Cited

FOREIGN PATENT DOCUMENTS

WO    WO 89/12618    12/1989
WO    WO 01/74909 A2    10/2001

OTHER PUBLICATIONS

Patent Abstracts of Japan, JP 2002-201378, Jul. 19, 2002.
Patent Abstracts of Japan, JP 2001-120978, May 8, 2001.
Patent Abstracts of Japan, JP 2000-327386, Nov. 28, 2000.

*Primary Examiner*—Patrick D Niland
(74) *Attorney, Agent, or Firm*—Oblon, Spivak, McClelland, Maier & Neustadt, L.L.P.

(57) ABSTRACT

A polymeric dispersant containing a vinyl polymer having a constitutional unit represented by the following formula 1:

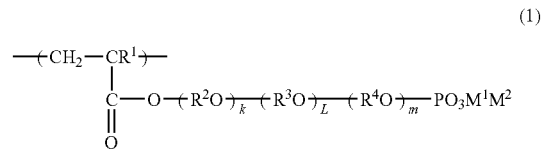

(1)

wherein $R^1$ is a hydrogen atom or a methyl group, $R^2$ and $R^4$ may be the same or different and are each independently an alkylene group having from 2 to 18 carbon atoms or an arylene group having from 6 to 18 carbon atoms, $R^3$ is an alkylene group having from 4 to 18 carbon atoms or an arylene group having from 6 to 18 carbon atoms, $M^1$ and $M^2$ may be the same or different and are each independently a hydrogen atom or a cation, k and m may be the same or different and are each independently a number from 0 to 20, and L is a number from 1 to 20, with the proviso that L is 2 or more when k is zero. The polymeric dispersant is used for the production of a water dispersion for ink-jet printing. The water dispersion for ink-jet printing is used for the production of a water-based ink for ink-jet printing.

3 Claims, No Drawings

POLYMERIC DISPERSANTS

FIELD OF THE INVENTION

The present invention relates to polymeric dispersants, water dispersions for ink-jet printing and water-based inks for ink-jet printing containing the water dispersions.

BACKGROUND OF THE INVENTION

In ink-jet printing methods, droplets of ink are directly projected onto a recording medium from very fine nozzles and allowed to adhere to the recording medium, to form characters and images. The ink-jet printing methods have been rapidly spread because of their various advantages such as easiness of full colorization, low costs, capability of using ordinary paper as the recording medium, non-contact with printed images and characters, etc. Among such printing methods, in view of enhancing the fastness to light of printed images and characters, an ink-jet printing method utilizing an ink containing a pigment as the colorant has now come to dominate.

In the ink containing a pigment as the colorant, however, the dispersion of the pigment is difficult to often reduce the storage stability of ink. In addition, the gloss of printed images and characters is inferior to those formed by an ink containing a dye as the colorant.

To remove such disadvantages, it has been proposed to use a polymeric dispersant which is made of several kinds of acrylic monomers each having a polyoxyethylene glycol chain (for example, EP 1 323 789A). However, it has been still demanded to develop an ink capable of forming images and characters with more excellent gloss.

There have been also disclosed a pigment composition suitable for ink-jet printing which contains a resin having phosphoric acid groups (for example, JP 2002-201378A), a phosphoric acid-based dispersant and a water-based ink for ink-jet printing containing such a dispersant (for example, JP 2003-506536A). However, the proposed composition and ink are still insufficient in gloss.

SUMMARY OF THE INVENTION

The present invention provides polymeric dispersants. The polymeric dispersant contains at least one vinyl polymer each having a constitutional unit represented by the following formula 1:

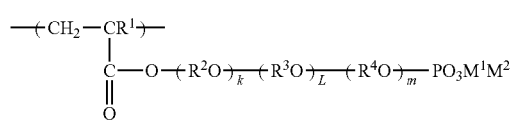

wherein $R^1$ is a hydrogen atom or a methyl group, $R^2$ and $R^4$ may be the same or different and are each independently an alkylene group having from 2 to 18 carbon atoms or an arylene group having from 6 to 18 carbon atoms, $R^3$ is an alkylene group having from 4 to 18 carbon atoms or an arylene group having from 6 to 18 carbon atoms, $M^1$ and $M^2$ may be the same or different and are each independently a hydrogen atom or a cation, k and m may be the same or different and are each independently a number from 0 to 20, and L is a number from 1 to 20, with the proviso that L is 2 or more when k is zero.

The present invention also provides a water dispersion for ink-jet printing which contains the polymeric dispersant.

The present invention also provides a water-based ink for ink-jet printing which contains the water dispersion.

DETAILED DESCRIPTION OF THE INVENTION

The present invention provides a novel polymeric dispersant, a water dispersion for ink-jet printing which contains the polymeric dispersant, water and a colorant, and a water-based ink for ink-jet printing which contains the water dispersion.

The present invention relates to a polymeric dispersant containing a vinyl polymer having a constitutional unit represented by the following formula 1:

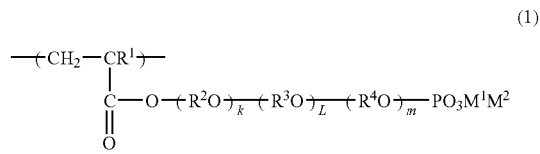

wherein $R^1$ is a hydrogen atom or a methyl group, $R^2$ and $R^4$ may be the same or different and are each independently an alkylene group having from 2 to 18 carbon atoms or an arylene group having from 6 to 18 carbon atoms, $R^3$ is an alkylene group having from 4 to 18 carbon atoms or an arylene group having from 6 to 18 carbon atoms, $M^1$ and $M^2$ may be the same or different and are each independently a hydrogen atom or a cation, k and m may be the same or different and are each independently a number from 0 to 20, and L is a number from 1 to 20, with the proviso that L is 2 or more when k is zero; a water dispersion for ink-jet printing which contains the polymeric dispersant, water and a colorant; and a water-based ink for ink-jet printing which contains the water dispersion.

The invention will be described in more detail below.

Polymeric Dispersant

The polymeric dispersant of the invention contains at least one vinyl polymer each having a constitutional unit of the formula 1. In the formula 1, $R^1$ is a hydrogen atom or a methyl group, with methyl group being preferred. $M^1$ and $M^2$ may be the same or different and are each independently a hydrogen atom or a cation. At least a part of $M^1$ and $M^2$ is preferably the cation, because the water dispersibility of the vinyl polymer is increased. Examples of the cation include alkali metal ions, alkaline earth metal ions, onium ions and basic amino acids.

Preferred examples of the alkali metal ions include ions of lithium, sodium, potassium, rubidium and cesium, with sodium ion and potassium ion being preferred. Preferred examples of the alkaline earth ions include magnesium ion and calcium ion.

The onium ions are preferably ions of the group 15 atoms of the periodic table, with onium ions of nitrogen atom and phosphorus atom being preferred. Preferred onium ions of nitrogen include ammonium ion, imidazolinium ion, alkyl- or alkyenylammonium ion having a total carbon number from 1 to 22, alkyl- or alkenyl-substituted pyridinium ion having a total carbon number from 1 to 22, aklanolammonium ion having a total carbon number from 1 to 22. Preferred onium ions of phosphorus include phosphonium ion. The onium ions may be primary, secondary, tertiary or quaternary.

In the formula 1, $R^2$ and $R^4$ may be the same or different and are each independently an alkylene group having from 2 to 18 carbon atoms or an arylene group having from 6 to 18 carbon atoms, with an alkylene group having from 2 to 8 carbon atoms or an arylene group having from 6 to 12 carbon atoms being preferred, an alkylene group having from 2 to 3 carbon atoms such as ethylene group, propylene group and trimethylene group being more preferred, and ethylene group or propylene group being particularly preferred. The alkylene groups may be straight or branched.

$R^3$ is an alkylene group having from 4 to 18 carbon atoms or an arylene group having from 6 to 18 carbon atoms. The alkylene group may include arylalkylene groups, and is preferably an alkylene group having from 4 to 12 carbon atoms or an arylalkylene group having from 7 to 12 carbon atoms, more preferably an alkylene group having from 4 to 10 carbon atoms or an arylalkylene group having from 7 to 10 carbon atoms. The alkylene groups may be straight or branched. The arylene group may include alkylarylene groups, and is preferably an arylene group having from 6 to 12 carbon atoms or an alkylarylene group having from 7 to 12 carbon atoms. Specific examples of $R^3$ include tetramethylene group, pentamethylene group, hexamethylene group, octamethylene group, decamethylene group, dodecamethylene group, 1,1-diphenylmethylene group, 2,2-diphenylpropylene group, 1,2-phenylene group, 1,3-phenylene group, 1,4-phenylene group, 1,2-naphthylene group, 1,4-naphthylene group, and 2,2'-bis(phenylene)propane group ($—C_6H_4—C(CH_3)_2—C_6H_4—$ derived from bisphenol A).

Suffixes k, L and m indicate average molar numbers of addition. The suffixes k and m may be the same or different and are each independently a number from 0 to 20, preferably from 0 to 16, more preferably from 0 to 10, and particularly preferably from 0 to 2. The suffix L is a number from 1 to 20, preferably from 1 to 10, more preferably from 1 to 5, and particularly preferably 1, with the proviso that L is 2 or more when k is zero.

The linkages $—(R^2O)_k—$, $—(R^3O)_L—$, and $—(R^4O)_m—$ bond to the ester oxygen atom in this order in block manner. Each of k $R^2$ groups, L $R^3$ groups and m $R^4$ groups may be the same or different. When each of k $R^2$ groups, L $R^3$ groups and m $R^4$ groups are different, for example, k $R^2$ groups include three different $R^{21}$, $R^{22}$ and $R^{23}$, $—(R^{21}O)—$, $—(R^{22}O)—$, and $—(R^{23}O)—$ constituting $—(R^2O)_k—$ may bond to each other in any manner of random bonding, block bonding and alternative bonding.

The content of the constitutional unit of the formula 1 in the vinyl polymer for use in the polymeric dispersant of the invention is preferably from 2 to 60% by weight, more preferably from 10 to 40% by weight and particularly preferably from 10 to 30% by weight in view of obtaining the water-based ink for ink-jet printing capable of forming images and characters with good gloss.

It is preferred for the vinyl polymer to further include a hydrophobic constitutional unit. In view of attaining a good dispersion stability of ink, the content of the hydrophobic constitutional unit in the vinyl polymer is preferably from 40 to 98% by weight, more preferably from 50 to 90% by weight and particularly preferably from 50 to 80% by weight. Examples of the hydrophobic constitutional unit include those derived from hydrophobic monomers B described below.

The content ratio of the constitutional unit of the formula 1 and the hydrophobic constitutional unit (constitutional unit of the formula 1/hydrophobic constitutional unit) is preferably from 1/1 to 1/8 by weight and more preferably from 1/2 to 1/6 by weight.

The vinyl polymer optionally includes a constitutional unit derived from a copolymerizable monomer C described below. In view of improving the dispersion stability, the content of the optional constitutional unit in the vinyl polymer is preferably from 0 to 40% by weight, more preferably from 1 to 30% by weight and particularly preferably from 10 to 25% by weight.

In view of improving the adsorptivity to the colorant, the vinyl polymer is preferably water-insoluble. The term "water-insoluble" referred to herein means that the vinyl polymer before neutralization dissolves in 100 g of water at 25° C. in an amount of less than 2 g. The acid value of the polymeric dispersant is preferably from 5 to 200 KOHmg/g and more preferably from 10 to 130 KOHmg/g, in view of stabilizing the dispersion.

Production of Polymeric Dispersant

The method of producing the vinyl polymer is not limited and the vinyl polymer is easily produced preferably by a known radical copolymerization of a monomer mixture containing a monomer A represented by the following formula 2:

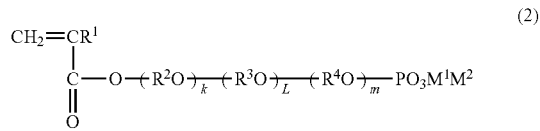

(2)

wherein $R^1$, $R^2$, $R^3$, $R^4$, $M^1$, $M^2$, k, L, and m are as defined above, the hydrophobic monomer B and the optional copolymerizable monomer C (hereinafter referred to simply as "monomer mixture").

The monomer A of the formula 2 is produced, for example, by the following method. (Meth)acrylic acid, its acid anhydride or its acid halide (hereinafter referred to as "(meth)acrylic acid and its related compound") and a hydroxyl diterminated alkylene glycol or polyoxyalkylene glycol are subjected to esterification reaction. After purifying the reaction product by a known method, the resultant alkylene glycol mono (meth)acrylate or polyoxyalkylene glycol mono (meth) acrylate is converted into the monomer A by the reaction with phosphorus oxychloride.

The reaction of the (meth)acrylic acid and its related compound with the hydroxyl diterminated alkylene glycol or polyoxyalkylene glycol is performed by using the (meth)acrylic acid and its related compound preferably from 0.5 to 2 mol per one mole of the hydroxyl group preferably at 50 to 130° C. in the presence of, if necessary, an acid or alkali catalyst. After purification by a known method, the resultant monoester is allowed to react with phosphorus oxychloride in the presence of an alkali catalyst. The reaction molar ratio is about 1.0 to 1.5 mol of phosphorus oxychloride per one mole of the monoester, and the reaction temperature is about −30 to −20° C.

Examples of the monomer A of the formula 2 include acid phosphoxytritetramethylene glycol methacrylate corresponding to tritetramethylene glycol into which a methacryloyl group and a phosphoric acid group are introduced ($R^1$=methyl group, $R^3$=tetramethylene group, k=0, L=3, m=0); acid phosphoxydihexamethylene glycol methacrylate corresponding to dihexamethylene glycol into which a methacryloyl group and a phosphoric acid group are introduced ($R^1$=methyl group, $R^3$=hexamethylene group, k=0, L=2, m=0); acid phosphoxy(ethylene oxide-decamethylene glycol-ethylene oxide) methacrylate corresponding to decamethylene glycol having each of two hydroxyl groups added with one mole of ethylene oxide, into which a methacryloyl group and phosphoric acid group are introduced ($R^1$=methyl group, $R^2$=ethylene group, $R^3$=decamethylene group, $R^4$=ethylene group, k=1, L=1, m=1); and acid phosphoxy (ethylene oxide-bisphenol A-ethylene oxide) methacrylate corresponding to bisphenol A having each of two hydroxyl groups added with one mole of ethylene oxide, into which a methacryloyl group and phosphoric acid group are introduced ($R^1$=methyl group, $R^2$=ethylene group, $R^3$=2,2'-bis (phenylene)propane group (derived from bisphenol A), $R^4$=ethylene group, k=1, L=1, m=1).

Hydrophobic Monomer B

The hydrophobic monomer B may be selected arbitrarily as long as hydrophobic and copolymerizable with the monomer A, and may include alkyl (meth)acrylates, aromatic ring-containing monomers, mocromers, etc. These monomers may be used alone or in combination of two or more.

Examples of the alkyl (meth)acrylate include (meth) acrylic esters having an ester moiety composed of an alkyl group having from 1 to 30 and preferably from 1 to 18 carbon atoms, such as methyl (meth)acrylate, ethyl (meth)acrylate, (iso)propyl (meth)acrylate, (iso or tert-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate, and (iso)stearyl (meth)acrylate. These esters may be used alone or in combination of two or more.

The term "(iso or tert-)alkyl" used herein means isoalkyl, tert-alkyl or n-alkyl, and the term "(iso)alkyl" means isoalkyl or n-alkyl. The term "(meth)acrylic acid" means acrylic acid or methacrylic acid, and the term "(meth)acrylate" means acrylate or methacrylate.

In view of achieving a good water resistance, the aromatic ring-containing monomer is preferably a vinyl monomer having an aromatic ring of 6 to 22, preferably 6 to 12 carbon atoms, which may have a hetero atom-containing substituent such as a halogen group, en ester group, an ether group and a hydroxyl group. More preferably, the aromatic ring-containing monomer is at least one compound selected from the group consisting of styrene, α-methylstyrene, vinylnaphthalene, vinyltoluene, ethylvinylbenzene, 4-vinylbiphenyl, 1,1-diphenylethylene, benzyl (meth)acrylate, phenoxyethyl (meth)acrylate, 2-hydroxy-3-phenoxypropyl acrylate, 2-methacryloyloxyethyl-2-hydroxypropyl phthalate, 2-acryloyloxyethylphthalic acid and neopentyl glycol acrylate benzoate. In view of enhancing the water resistance and rubbing resistance of printed images and characters, at least one compound selected from the group consisting of styrene, α-methylstyrene, vinyltoluene and vinylnaphthalene is preferably used.

The macromers may be those having a polymerizable functional group at one terminal end and a number average molecular weight preferably from 500 to 500,000 and more preferably from 1,000 to 10,000. Examples of the macromers include styrene-based macromers having a polymerizable functional group at one terminal end, silicone-based macromers having a polymerizable functional group at one terminal end, methyl methacrylate-based macromers having a polymerizable functional group at one terminal end, butyl acrylate-based macromers having a polymerizable functional group at one terminal end, and isobutyl methacrylate-based macromers having a polymerizable functional group at one terminal end, with the styrene-based macromers having a polymerizable functional group at one terminal end being preferred in view of allowing the vinyl polymer particles to include a sufficient amount of pigment.

The styrene-based macromers having a polymerizable functional group at one terminal end may include styrene homopolymers having a polymerizable functional group at one terminal end and copolymers of styrene and another monomer such as acrylonitrile having a polymerizable functional group at one terminal end. The content of styrene in the copolymers is preferably 60% by weight or higher and more preferably 70% by weight or higher in view of allowing a pigment to become sufficiently incorporated into the vinyl polymer particles. The terminal polymerizable functional group of the styrene-based macromer is preferably an acryloyloxy group or a methacryloyloxy group.

The styrene-based macromer is commercially available, for example, from Toagosei Co., Ltd. as product names of AS-6, AS-6S, AN-6, AN-6S, HS-6, HS-6S, etc.

In view of preventing the head scorching of ink-jet printer, preferably used is the silicone-based macromer represented by the following formula 3:

$$X(Y^1)_u Si(R^5)_{3-v}(Z)_v \quad (3)$$

wherein X is a polymerizable unsaturated group, $Y^1$ is a divalent bonding group, $R^5$ is hydrogen atom, a lower alkyl group, an aryl group or an alkoxyl group, Z is a monovalent siloxane polymer residue having a number average molecular weight of 500 or more, u is 0 or 1, and v is an integer from 1 to 3, with the proviso that two $R^5$ groups may be the same or different when v is 1.

The number average molecular weight of the macromer may be determined by a gel-permeation chromatography using chloroform contain 1 mmol/L dodecyldimethylamine as the solvent and polystyrene as the standard substance.

Copolymerizable Monomer C

The optional copolymerizable monomers C may include hydrophilic nonionic monomers and slat-forming group-containing monomers other than the monomer A of the formula 2.

As the hydrophilic nonionic monomers, preferably used are compounds represented by the following formula 4:

$$CH_2=C(R^6)C(O)O(Y^2O)_p-R^7 \quad (4)$$

wherein $Y^2$ is a straight chain or branched chain alkylene group having from 2 to 4 carbon atoms, p is a number from 2 to 100, $R^6$ is a hydrogen atom or a methyl group, $R^7$ is a hydrogen atom, a straight chain or branched chain alkyl group having from 1 to 12 carbon atoms, an aryl group having from 6 to 12 carbon atoms, or an aralkyl group having from 6 to 12 carbon atoms, and/or (meth)acrylamide-based monomers.

$Y^2$, $R^6$ and $R^7$ may be arbitrarily combined. In the formula 4, p $Y^2$ groups may be the same or different, and bonded in either block manner or random manner. The suffix p is preferably 2 to 30, and R7 is preferably a hydrogen atom, a methyl group or a 2-ethylhezyl group.

Specific examples of the compound of the formula 4 include polyethylene glycol monomethacrylate, polypropylene glycol monomethacrylate and polytetramethylene glycol monomethacrylate.

Examples of the (meth)acrylamide-based monomers include N,N-dimethyl(meth)acrylamide, N-t-butyl(meth) acrylamide, N-t-octyl(meth)acrylamide, N-isopropyl(meth) acrylamide and 2-(meth)acrylamido-2-methylpropanephosphonic acid.

Examples of the slat-forming group-containing monomers other than the monomer A of the formula 2 include unsaturated carboxylic acids such as acrylic acid and methacrylic acid; and unsaturated sulfonic acids such as styrenesulfonic acid and 2-acrylamido-2-methylpropanesulfonic acid.

In the monomer mixture for producing the vinyl polymer to be used as the polymeric dispersant of the invention, the content of the monomer A of the formula 2 is preferably from 2 to 60% by weight, more preferably from 10 to 40% by weight and particularly preferably from 10 to 30% by weight, in view of producing a water-based ink for ink-jet printing capable of forming printed images and characters with a good gloss. The content of the hydrophobic monomer B is preferably from 40 to 98% by weight, more preferably from 50 to 90% by weight and particularly preferably from 50 to 80% by weight, in view of enhancing the dispersion stability of the ink. The weight ratio of the monomer A of the formula 2 and the hydrophobic monomer B (monomer A/monomer B) is preferably from 1/1 to 1/8 and more preferably 1/2 to 1/6. In view of improving the dispersion stability, the content of the optional copolymerizable monomer C is preferably from 0 to 40% by weight, more preferably from 1 to 30% by weight and particularly preferably from 10 to 25% by weight.

In the vinyl polymer, the constitutional unit of the formula 1 and the constitutional units derived from other monomers may be linked in any manners of random bonding, block bonding, graft bonding and combinations thereof.

The radical polymerization for producing the vinyl polymer to be used as the polymeric dispersant of the invention may be carried out in any of bulk polymerization method, solution polymerization method, suspension polymerization method, emulsion polymerization method, etc., with the solution polymerization method being preferred because it is carried out most easily.

The solvent for the solution polymerization method is preferably an organic polar solvent, although not limited thereto. The organic polar solvent may be a mixture with water. Examples of the organic polar solvents include aliphatic alcohols having from 1 to 3 carbon atoms such as methanol, ethanol and propanol; ketones such as acetone, methyl ethyl ketone and methyl isobutyl ketone; and esters such as ethyl acetate, with ethanol, acetone, methyl ethyl ketone, methyl isobutyl ketone, and mixtures thereof with water being preferred.

The polymerization may be carried out in the presence of a radical polymerization initiator. Preferred radical polymerization initiators are azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile), and 1,1'-azobis(1-cyclohexanecarobonitrile). Alternatively, organic peroxides such as t-butyl peroxyoctoate, di-t-butyl peroxide and dibenzoyl peroxide may be also used.

The amount of the radical polymerization initiator to be used is preferably from 0.001 to 5 mol % and preferably from 0.01 to 2 mol % based on the monomer mixture.

The polymerization conditions of the monomer mixture vary depending on the kinds of the radical polymerization initiator, monomers, solvent, etc. to be used, and the polymerization is generally conducted at 30 to 100° C., preferably 50 to 80° C. for 1 to 20 h. The polymerization is conducted preferably in an atmosphere of inert gas such as nitrogen gas. After completing the polymerization, the vinyl polymer having the constitutional units of the formula 1 is isolated from the reaction product solution by a known reprecipitation, removal of solvent by distillation, etc. The vinyl polymer thus obtained may be purified by repeated reprecipitation, membrane separation, chromatography, extraction, etc. for removing non-reacted monomers, etc.

The weight average molecular weight of the vinyl polymer for the polymeric dispersant of the invention is preferably from 1,000 to 1,000,000 and more preferably from 2,000 to 500,000, although not limited thereto. The polymerization may be carried out in the presence of a chain transfer agent to regulated the molecular weight. The weight average molecular weight referred to herein is determined by a gel-permeation chromatography using chloroform containing 1 mmol/L dodecyldimethylamine as the solvent and polystyrene as the standard substance.

Examples of the chain transfer agents include mercaptans such as octyl mercaptan, n-dodecyl mercaptan, t-dodecyl mercaptan, n-tetradecyl mercaptan and 2-mercaptoethanol; xanthogen disulfides such as dimetylxanthogen disulfide and diisopropylxanthogen disulfide; thiuram disulfides such as tetramethylthiuram disulfide and tetrabutylthiuram disulfide; halogenated hydrocarbons such as carbon tetrachloride and ethylene bromide; hydrocarbons such as pentaphenylethane; acrolein; methacrolein; allyl alcohol; 2-ethylhexyl thioglycolate; unsaturated cyclic hydrocarbons such as terpinolene, $\alpha$-terpinene, $\gamma$-terpinene, dipentene, $\alpha$-methylstyrene dimer, 9,10-dihydroanthracene, 1,4-dihydronaphthalene, indene and 1,4-cyclohexadiene; and unsaturated heterocyclic compounds such as 2,5-dihydrofuran. These chain transfer agents may be used alone or in combination of two or more.

The vinyl polymer thus obtained per se is water-dispersible or not. If not, the vinyl polymer is made into water-dispersible by neutralizing the phosphoric acid group with a neutralizing agent, thereby obtaining the polymeric dispersant. The degree of neutralization of the phosphoric acid group is preferably from 10 to 200%, more preferably from 20 to 150%, and particularly preferably from 50 to 150%.

The cation-forming basic compounds described above may be used as the neutralizing agent. Preferred examples thereof include alkali metal hydroxides such as sodium hydroxide and potassium hydroxide; alkaline earth metal hydroxides; and onium salt-forming compounds such as triethanolamine and ammonia.

The degree of neutralization is determined by the following formula:

$$[N(g)/\text{equivalent of N}]/[\text{acid value of polymer (KOHmg/g)} \times \text{weight of polymer (g)}/(56 \times 1000)] \times 100$$

wherein $N(g)$ is the weight of the neutralizing agent and the equivalent of N is an equivalent of the neutralizing agent.

Water Dispersion and Water-Based Ink for Ink-Jet Printing

The water dispersion and water-based ink for ink-jet printing of the invention contain the polymeric dispersant, water and colorant. The word "water-based" in the term "water-based ink for ink-jet printing" means that water constitutes the largest part of the solvent of the water-based ink. Thus, the solvent may be 100% by weight of water or a mixture of water and one or more kinds of organic solvent as long as the above requirement is met.

The colorant may be either dye or pigment, or may be a mixture thereof in an arbitrary mixing ratio. To meet the recent strong demand for a high fastness to light, the pigment is preferably used.

The pigment may be either organic or inorganic. An extender pigment may be combinedly used with the organic or inorganic pigment, if necessary.

Examples of the organic pigments include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments. Specific examples of preferred organic pigments include C.I. Pigment Yellow 13, 17, 74, 83, 97, 109, 110, 120, 128, 139, 151, 154, 155, 174, 180; C.I. Pigment Red 48, 57:1, 122, 146, 176, 184, 185, 188, 202; C.I. Pigment Violet 19, 23; C.I. Pigment Blue 15, 15:1, 15:2, 15:3, 15:4, 16, 60; and C.I. Pigment Green 7, 36.

Examples of the inorganic pigments include carbon blacks, metal oxides, metal sulfides, and metal chlorides, with the carbon blacks being preferred particularly for black water-based inks. The carbon blacks may include furnace blacks, thermal lamp blacks, acetylene blacks and channel blacks.

The extender pigments may include silica, calcium carbonate and talc.

As the dye, hydrophobic dyes are preferably used because easily become included in particles of the water-insoluble vinyl polymer. The hydrophobic dyes may include oil dyes, disperse dyes, etc. To allow the dye to efficiently become included in particles of vinyl polymer, the solubility of the hydrophobic dye is preferably 2 g/L or higher and more preferably from 20 to 500 g/L based on the organic solvent to be used for dissolving the hydrophobic dye in the production of the water dispersion.

Examples of the oil dyes include C.I. Solvent Black 3, 7, 27, 29, 34, 45; C.I. Solvent Yellow 14, 16, 29, 56, 82, 83:1; C.I. Solvent Red 1, 3, 8, 18, 24, 27, 43, 49, 51, 72, 73; C.I. Solvent Violet 3; C.I. Solvent Blue 2, 4, 11, 44, 64, 70; C.I. Solvent Green 3, 7; and C.I. Solvent Orange 2, although not limited thereto.

Examples of commercially available oil dyes include Nubian Black PC-0850, Oil Black HBB, Oil Black 860, Oil Yellow 129, Oil Yellow 105, Oil Pink 312, Oil Red 5B, Oil Scarlet 308, Vali Fast Blue 2606 and Oil Blue BOS (all product names of Orient Chemical Industries, Ltd.); and Neopen Yellow 075, Neopen Mazenta SE1378, Neopen Blue 808, Neopen Blue FF4012, and Neopen Cyan FF4238 (all product names of BASF Aktiengesellschaft).

Preferred examples of the disperse dyes include C.I. Disperse Yellow 5, 42, 54, 64, 79, 82, 83, 93, 99, 100, 119, 122, 124, 126, 160, 184:1, 186, 198, 199, 204, 224, 237; C.I. Disperse Orange 13, 29, 31:1, 33, 49, 54, 55, 66, 73, 118, 119, 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, 368; and C.I. Disperse Green 6:1, 9, although not limited thereto. Of the above dyes, preferred are C.I. Solvent Yellow 29 and 30 for yellow colorant, C.I. Solvent Blue 70 for cyan colorant, C.I. Solvent Red 18 and 49 for magenta colorant, and C.I. Solvent Black 3 and 7 and nigrosine black dyes for black colorant.

To enhance the optical density of printed images and characters, the content of the colorant in the water dispersion and water-based ink of the invention is preferably from 1 to 20% by weight and more preferably from 2 to 10% by weight. In view of the dispersibility of the colorant, the content of the polymeric dispersant in the water dispersion and water-based ink is preferably from 1 to 20% by weight and more preferably from 2 to 10% by weight, and the content of water is preferably from 40 to 90% by weight and more preferably from 50 to 80% by weight.

To enhance the optical density of printed images and characters, the content of the colorant is preferably from 20 to 1,000 parts by weight, more preferably from 40 to 800 parts by weight, and still more preferably from 60 to 600 parts by weight based on 100 parts by weight of the solid component of the polymeric dispersant.

The production method of the water-based ink for ink-jet printing of the invention is not limited.

For example, the water-based ink for ink-jet printing is produced as follows. First, the polymeric dispersant of the invention is dissolved in an organic solvent, and then, the colorant and water together with the optional neutralizing agent such as alkali metal hydroxide, alkaline earth metal hydroxide and alkanolamine, the optional surfactant and other optional components are added to the solution of the polymeric dispersant in the organic solvent under mixing. The added components are dispersed, if necessary, by using an optimum mixer or a dispersing machine which is selected according to the intended degree of dispersion. By removing the organic solvent from the dispersion, a water dispersion of vinyl polymer particles including the colorant is obtained. Examples of the organic solvents include alcohol solvents, ketone solvents, ether solvents, aromatic hydrocarbon solvents, aliphatic hydrocarbon solvents, alicyclic hydrocarbon solvents and halogenated aliphatic hydrocarbon solvents, with acetone and methyl ethyl ketone being more preferred.

The average particle size of the vinyl polymer particles including the colorant which are dispersed in the water dispersion and the water-based ink is determined by the measuring method described below. In view of the dispersion stability, the average particle size is preferably from 0.01 to 1 μm and more preferably 0.02 to 0.5 μm.

When the colorant is the pigment or the hydrophobic dye, and the polymeric dispersant is made of the water-insoluble vinyl polymer having the constitutional units of the formula 1, the water dispersion thus obtained is a dispersion of vinyl polymer particles including the colorant.

The particle shape of the vinyl polymer particles including the colorant is not critical as long as the particles are formed at least from the colorant and the vinyl polymer. For example, a particle shape where the colorant is enclosed in the vinyl polymer, a particle shape where the colorant is uniformly dispersed throughout the vinyl polymer, a particle shape where the colorant is enclosed in the vinyl polymer and partly exposed to the surface of particles, and other particle shapes are included in the invention.

In another production method, the water-based ink for ink-jet printing is produced by mixing the polymeric dispersant, the colorant and water together with the optional neutralizing agent such as alkali metal hydroxide, alkaline earth metal hydroxide and alkanolamine, the optional surfactant and other optional components, followed by dispersing with a dispersing machine, if necessary.

The water-based ink for ink-jet printing of the invention may further contains wetting agents, penetrants, dispersants, viscosity modifiers, defoaming agents, mildew-proof agents, anti-corrosion agents, etc. The addition amounts are arbitrary and the additives are used in amounts optimum for exhibiting the properties required. The pH value of the water-base ink of the invention is preferably from 4 to 10.

The following examples further describe and demonstrate embodiments of the present invention. The examples are given only solely for the purpose of illustration and are not to be construed as limitations of the present invention.

The properties of the water-based ink for ink-jet printing were evaluated by the following methods.

(1) Gloss

Solid image printing was carried out on a commercially available MC glossy paper (KA420MK manufactured by Seiko Epson Corporation) by using an ink-jet printer (Model EM930C manufactured by Seiko Epson Corporation). After allowing the printed paper to stand at 25° C. for one hour, the gloss was measured by a glossmeter (HANDY CLOSSMETER PG-1 (product name) manufactured by Nippon Denshoku Industries Co., Ltd.) and evaluated on 60° gloss according to the following ratings.

Evaluation Ratings

◎: gloss 40 or more

○: gloss 35 or more, but less than gloss 40

Δ: gloss 30 or more, but less than gloss 35

X: less than gloss 30

The ratings ◎ and ○ are of no problems in practical use.

(2) Average Particle Size

The average particle size was measured by using a laser particle analyzing system ELS-8000 (cumulant method) manufactured by Ohtsuka Denshi Co., Ltd. under the following conditions.

Measuring temperature: 25° C.

Angle between incident light and detector: 90°

Number of cumulation: 100

Input refractive index of dispersing medium: 1.333 (refractive index of water)

Polymer particle concentration of sample: $5 \times 10^{-3}$% by weight (3) Storage Stability The average particle size of polymer particles including the colorant in the ink was measured by using the laser particle analyzing system ELS-8000 (cumulant method) manufactured by Ohtsuka Denshi Co., Ltd. (Average Particle Size before Storage). Then, one gram of ink produced in Example 1, Comparative Example 1 or 2 was placed in a glass cup (sealed container). After stored for 12 h at 40° C. under 0.02 MPa, the average particle size was measured in the same manner as above (Average Particle Size after Storage). The index for the dispersion stability was calculated from the following formula:

Degree of dispersion stability (%)=[(average particle size after storage)/(average particle size before storage)]×100, and evaluated according to the following ratings:

○: less than 250 (completely no problems in practical use)

Δ: 250 or more, but less than 350 (no problems in practical use)

X: 350 or more (cause problems in practical use)

SYNTHESIS EXAMPLE 1

Synthesis of acid phosphoxytri(tetramethylene glycol) methacrylate of the Formula 2 ($R^1$=methyl group, $R^3$=tetramethylene group, k=0, L=3, m=0, $M^1$=$M^2$=hydrogen atom)

Into a 500-mL four-necked flask, were charged 140 g (1.6 mol) of methacrylic acid, 325 g (1.3 mol) of tritetramethylene glycol (PTG-L manufactured by Hodogaya Chemical Co. Ltd.; average molecular weight of 250), 15 g of p-toluenesulfonic acid, and 0.6 g of 2,2'-methylenebis(4-ethyl-tert-butylphenol). Under reduced pressure (0.0066 to 0.013 MPa), the mixture was heated to 90° C. and water was distilled off by blowing oxygen for 1.5 h. After the reaction, the reaction liquid was added with 300 mL of hexane, cooled to room temperature, and allowed to stand overnight at about 5° C. After removing the precipitated tritetraethylene glycol by filtration, the filtrate was repeatedly washed with an aqueous sodium hydrogen carbonate in a separation funnel until the washings became alkaline, and then, washed with ion-exchanged water. After drying the organic phase over anhydrous sodium sulfate, the organic solvent was removed by using a rotary evaporator. The crude product was purified by a silica-gel chromatography (chloroform:methanol=20:1). Then, 20 mg of hydroquinone monomethyl ether was added and the organic solvent was removed, to obtain 100 g of tritetramethylene glycol monomethacrylate. The purity determined by a liquid chromatography was 97% or more.

A solution of 36.8 g (0.24 mol) of phosphorus oxychloride in 70 mL of ethyl ether was placed in a 300-mL four-necked flask and cooled to −30 to −20° C. Into the solution of phosphorus oxychloride, a solution of 67 g (0.2 mol) of tritetramethylene glycol monomethacrylate and 24.2 g (0.24 mol) of triethylamine in 70 mL of ethyl ether was added dropwise from a dropping funnel over about 2 h under stirring while blowing dry nitrogen gas. After the dropwise addition, the mixture was stirred for 3 h at temperatures lower than −20° C., to synthesize a phosphoric ester intermediate. Thereafter, the temperature was raised to 0° C. and the produced triethylamine hydrochloride was removed by filtration. After adding 20 g of ion-exchanged water and 20 mg of hydroquinone monomethyl ether, the filtrate was stirred for 2 h at 40° C. Then, the ethyl ether was distilled off under reduced pressure. The resultant liquid was dispersed in 200 mL of ion-exchanged water and sodium carbonate was added until the liquid became alkaline. The obtained aqueous solution was washed three times with chloroform in a separation funnel. After adding a 6N hydrochloric acid to the aqueous solution until the pH was 1 or less, the aqueous solution was extracted three times with ethyl acetate. The collected ethyl acetate solution was dried over sodium sulfate, added with 20 mg of hydroquinone monomethyl ether, and then, concentrated under reduced pressure, to obtain 48 g of crude acid phosphoxytri(tetramethylene glycol) methacrylate as a pale yellow liquid. After purifying the liquid by a silica-gel chromatography (chloroform:methanol=20:1), 20 mg of hydroquinone monomethyl ether was added and the organic solvent was distilled off, to obtain 40 g of acid phosphoxytri(tetramethylene glycol) methacrylate with a purity of 95% or more.

By $^{31}$P-NMR analysis, it was confirmed that the obtained monomer had a phosphoric acid group. The acid value thereof was 293 KOHmg/g.

SYNTHESIS EXAMPLE 2

Synthesis of acid phosphoxy(ethylene glycol-decamethylene glycol-ethylene glycol) methacrylate of the Formula 2 ($R^1$=methyl Group, $R^2$=ethylene Group, $R^3$=decamethylene Group, $R^4$=ethylene Group, k=1, L=1, m=1, $M^1$=$M^2$=hydrogen atom)

Into a 500 mL four-necked flask, were charged 140 g (1.6 mol) of methacrylic acid, 347 g (1.3 mol) of ethylene glycol-decamethylene glycol-ethylene glycol block copolymer (hydroxyl value: 419 mgKOH/g; prepared from decamethylene glycol and ethylene oxide in the presence of an alkali catalyst), 15 g of p-toluenesulfonic acid, and 0.6 g of 2,2'-methylenebis(4-ethyl-tert-butylphenol). Under reduced pressure (0.0066 to 0.013 MPa), the mixture was heated to 90° C. and water was distilled off by blowing oxygen for 1.5 h. After the reaction, the reaction liquid was added with 300 mL of hexane, cooled to room temperature, and allowed to stand overnight at about 5° C. After removing the precipitated ethylene glycol-decamethylene glycol-ethylene glycol block copolymer by filtration, the filtrate was repeatedly washed with an aqueous sodium hydrogen carbonate in a separation funnel until the washings became alkaline, and then, washed with ion-exchanged water. After drying the organic phase over anhydrous sodium sulfate, the organic solvent was removed by using a rotary evaporator. The crude product was purified by a silica-gel chromatography (chloroform:methanol=20:1). Then, 20 mg of hydroquinone monomethyl ether was added and the organic solvent was removed, to obtain 90 g of monomethacrylate of ethylene glycol-decamethylene glycol-ethylene glycol block copolymer. The purity determined by a liquid chromatography was 97% or more.

A solution of 36.8 g (0.24 mol) of phosphorus oxychloride in 70 mL of ethyl ether was placed in a 300-mL four-necked flask and cooled to −30 to −20° C. Into the solution of phosphorus oxychloride, a solution of 70 g (0.2 mol) of monomethacrylate of ethylene glycol-decamethylene glycol-ethylene glycol block copolymer and 24.2 g (0.24 mol) of triethylamine in 70 mL of ethyl ether was added dropwise from a dropping funnel over about 2 h under stirring while blowing dry nitrogen gas. After the dropwise addition, the mixture was stirred for 3 h at temperatures lower than −20° C., to synthesize a phosphoric ester intermediate. Thereafter, the temperature was raised to 0° C. and the produced triethylamine hydrochloride was removed by filtration. After adding 20 g of ion-exchanged water and 20 mg of hydroquinone monomethyl ether, the filtrate was stirred for 2 h at 40° C. Then, the ethyl ether was distilled off under reduced pressure. The resultant liquid was dispersed in 200 mL of ion-exchanged water and sodium carbonate was added until the liquid became alkaline. The obtained aqueous solution was washed three times with chloroform in a separation funnel. After adding a 6N hydrochloric acid to the aqueous solution until the pH was 1 or less, the aqueous solution was extracted three times with ethyl acetate. The collected ethyl acetate solution was dried over sodium sulfate, added with 20 mg of hydroquinone monomethyl ether, and then, concentrated under reduced pressure, to obtain 40 g of crude acid phosphoxy(ethylene glycol-decamethylene glycol-ethylene glycol) methacrylate as a pale yellow liquid. After purifying the liquid by a silica-gel chromatography (chloroform:methanol=20:1), 20 mg of hydroquinone monomethyl ether was added and the organic solvent was distilled off, to obtain 35 g of acid phosphoxy(ethylene glycol-decamethylene glycol-ethylene glycol) methacrylate with a purity of 97% or more. By $^{31}$P-NMR analysis, it was confirmed that the obtained monomer had a phosphoric acid group. The acid value thereof was 288 KOHmg/g.

SYNTHESIS EXAMPLE 3

Synthesis of Polymeric Dispersant From Monomer Obtained in Synthesis Example 1

In a reaction vessel, 10 parts by weight of methyl ethyl ketone, 0.3 part by weight of 2-mercaptoethanol, 2.5 parts by weight of polypropylene glycol monomethacrylate, 3 parts by weight of a styrene macromer solution, 4.6 parts by weight of styrene monomer, and 1.4 parts by weight of the monomer obtained in Synthesis Example 1 were mixed and the inner atmosphere was thoroughly replaced by nitrogen gas, to obtain a mixed solution.

Separately, in a dropping funnel, 0.7 part by weight of 2-mercaptoethanol, 22.5 parts by weight of polypropylene glycol monomethacrylate, 27 parts by weight of a styrene macromer solution, 39 parts by weight of styrene monomer, 12.6 parts by weight of the monomer obtained in Synthesis Example 1, 50 parts by weight of methyl ethyl ketone, and 1.4 parts by weight of 2,2'-azobis(2,4-dimethylvaleronitrile) were mixed and the inner atmosphere was thoroughly replaced by nitrogen gas, to obtain a mixed solution.

Under nitrogen atmosphere, the mixed solution in the reaction vessel was heated to 75° C. under stirring, and the mixed solution in the dropping funnel was slowly added dropwise over 3 h. After 2 h of the completion of the dropwise addition, a solution of 0.3 part by weight of 2,2'-azobis(2,4-dimethylvaleronitrile) in 5 parts by weight of methyl ethyl ketone was added, and then, the mixture was aged for 2 h at 75° C. After adding a solution of 0.3 part by weight of 2,2'-azobis (2,4-dimethylvaleronitrile) in 5 parts by weight of methyl ethyl ketone, the aging was further continued for one hour at 80° C., to obtain a polymeric dispersant 1 of the invention having the structure of the formula 1 ($R^1$=methyl group, $R^3$=tetramethylene group, k=0, L=3, m=0, $M^1$=$M^2$=hydrogen atom). The acid value was 41 KOHmg/g.

The weight average molecular weight of the obtained polymeric dispersant 1 was 38,000 when measured by a gel-permeation chromatography using polystyrene as the standard substance and chloroform dissolving 1 mmol/L dodecyldimethylamine as the solvent.

The compounds used above are shown below.

Methyl ethyl ketone and 2-mercaptoethanol: 1st grade, manufactured by Wako Pure Chemical Industries, Ltd.

2,2'-Azobis(2,4-dimethylvaleronitrile): V-65, manufactured by Wako Pure Chemical Industries, Ltd.

Styrene macromer solution: AS-6S(Styrene Macromer), product name, manufactured by Toagosei Co., Ltd., solid content: 50% by weight; number average molecular weight: 6,000

Polypropylene glycol monomethacrylate: manufactured by Aldrich Japan K.K., number average molecular weight: 375

Styrene monomer: special grade, manufactured by Wako Pure Chemical Industries, Ltd.

SYNTHESIS EXAMPLE 4

Synthesis of Polymeric Dispersant from Monomer Obtained in Synthesis Example 2

In the same manner as in Synthesis Example 3 except for using the monomer obtained in Synthesis Example 2 in place of the monomer obtained in Synthesis Example 1, a polymeric dispersant 2 of the invention having the structure of the formula 1 ($R^1$=methyl group, $R^2$=ethylene group, $R^3$=decamethylene group, $R^4$=ethylene group, k=1, L=1, m=1, $M^1$=$M^2$=hydrogen atom) was produced. The acid value was 40 KOHmg/g and the weight average molecular weight was 25,000.

SYNTHESIS EXAMPLE 5

Synthesis of Comparative Polymer

In the same manner as in Synthesis Example 3 except for using acid phosphoxypolypropylene glycol methacrylate (Phosmer PP manufactured by Uni-Chemical Co., Ltd., acid value: 238 KOHmg/g) in place of the monomer obtained in Synthesis Example 1, a comparative polymer 1 was produced. The acid value was 33 KOHmg/g and the weight average molecular weight was 50,000.

SYNTHESIS EXAMPLE 6

Synthesis of Comparative Polymer

In a reaction vessel, 10 parts by weight of methyl ethyl ketone, 0.03 part by weight of 2-mercaptoethanol, 3 parts by weight of a styrene macromer solution, 7.1 parts by weight of styrene monomer, and 1.4 parts by weight of methacrylic acid were mixed and the inner atmosphere was thoroughly replaced by nitrogen gas, to obtain a mixed solution.

Separately, in a dropping funnel, 0.27 part by weight of 2-mercaptoethanol, 27 parts by weight of a styrene macromer solution, 63 parts by weight of styrene monomer, 12.6 parts by weight of methacrylic acid, 50 parts by weight of methyl ethyl ketone, and 1.2 parts by weight of 2,2'-azobis(2,4-dimethylvaleronitrile) were mixed and the inner atmosphere was thoroughly replaced by nitrogen gas, to obtain a mixed solution.

Under a nitrogen atmosphere, the mixed solution in the reaction vessel was heated to 75° C. under stirring, and the mixed solution in the dropping funnel was slowly added dropwise over 3 h. After 2 h of the completion of the dropwise addition, a solution of 0.3 part by weight of 2,2'-azobis(2,4-dimethylvaleronitrile) in 5 parts by weight of methyl ethyl ketone was added, and then, the mixture was aged for 2 h at 75° C. After adding a solution of 0.3 part by weight of 2,2'-azobis(2,4-dimethylvaleronitrile) in 5 parts by weight of methyl ethyl ketone, the aging was further continued for one hour at 80° C., to obtain a comparative polymer 2 having a carboxylic group. The acid value was 91 KOHmg/g and the weight average molecular weight was 35,000.

PREPARATION EXAMPLE 1

Into 25 parts by weight of methyl ethyl ketone, was dissolved 15 parts by weight (solid basis) of the polymeric dispersant 1 obtained in Synthesis Example 3. Into the solution, 1.2 parts by weight of a neutralizing agent (5 mol/L aqueous sodium hydroxide manufactured by Wako Pure Chemical Industries, Ltd., volumetric analytical grade) was added, and then, 35 parts by weight of Carbon Black Monarch 800 (manufactured by Cabot Corporation) was further added as the colorant. After added with 300 parts by weight of ion-exchanged water and stirred, the mixture was dispersed for 30 min by using a microfluidizer (manufactured by Microfluidics Co., Ltd.). The resultant mixture was added with 120 parts by weight of ion-exchanged water and stirred. Then, methyl ethyl ketone was removed at 70° C. under reduced pressure and a part of water was also removed, to obtain a water dispersion 1 (solid content: 20% by weight) containing carbon black as the colorant. The average particle size of dispersed polymer particles including carbon black was 140 nm.

PREPARATION EXAMPLE 2

In the same manner as in Preparation Example 1 except for using the polymeric dispersant 2 obtained in Synthesis Example 4 in place of the polymeric dispersant 1 obtained in Synthesis Example 3, and using the 5 mol/L aqueous sodium hydroxide in an amount of 1.15 parts by weight in place of 1.2 parts by weight, a water dispersion 2 (solid content: 20% by weight) was produced. The average particle size was 135 nm.

PREPARATION EXAMPLE 3

In the same manner as in Preparation Example 1 except for using the comparative polymer 1 obtained in Synthesis Example 5 in place of the polymeric dispersant 1 obtained in Synthesis Example 3, and using the 5 mol/L aqueous sodium hydroxide in an amount of 2.1 parts by weight in place of 1.2 parts by weight, a water dispersion 3 (solid content: 20% by weight) was produced. The average particle size was 160 nm.

PREPARATION EXAMPLE 4

In the same manner as in Preparation Example 1 except for using the comparative polymer 2 obtained in Synthesis Example 6 in place of the polymeric dispersant 1 obtained in Synthesis Example 3, and using the 5 mol/L aqueous sodium hydroxide in an amount of 2.9 parts by weight in place of 1.2 parts by weight, a water dispersion 4 (solid content: 20% by weight) was produced. The average particle size was 110 nm.

EXAMPLE 1

A mixture was prepared by mixing 24.7 parts by weight of the water dispersion 1 (solid content: 20% by weight) obtained in Preparation Example 1, 10 parts by weight of glycerol (Special Grade, manufactured by Wako Pure Chemical Industries, Ltd.), 7 parts by weight of triethylene glycol monobutyl ether (Special Grade, manufactured by Wako Pure Chemical Industries, Ltd.), one part by weight of Surfynol 465 (manufactured by Air Products Co., Ltd.), 0.3 part by weight of Proxel XL2(S) (manufactured by Zeneca Co., Ltd.), and 58 parts by weight of ion-exchanged water. To remove coarse particles, the mixture was filtered through a 25-mL needleless syringe (manufactured by Terumo Corporation) equipped with a 5-μm filter (acetylcellulose membrane manufactured by Fuji Photo Film Co., Ltd.; outer diameter: 2.5 cm), thereby producing a water-based ink for ink-jet printing 1 of the invention. The water-based ink for ink-jet printing 1 was evaluated for the gloss and the storage stability in the manners described above. The results are shown in Table 1.

EXAMPLE 2

In the same manner as in Example 1 except for using the water dispersion 2 (solid content: 20% by weight) obtained in Preparation Example 2 in place of the water dispersion 1 obtained in Preparation Example 1, a water-based ink for ink-jet printing 2 of the invention was produced. The water-based ink for ink-jet printing 2 was evaluated for the gloss and the storage stability in the manners described above. The results are shown in Table 1.

COMPARATIVE EXAMPLE 1

In the same manner as in Example 1 except for using the water dispersion 3 (solid content: 20% by weight) obtained in Preparation Example 3 in place of the water dispersion 1 obtained in Preparation Example 1, a comparative ink 1 was produced. The comparative ink 1 was evaluated for the gloss and the storage stability in the manners described above. The results are shown in Table 1.

COMPARATIVE EXAMPLE 2

In the same manner as in Example 1 except for using the water dispersion 4 (solid content: 20% by weight) obtained in Preparation Example 4 in place of the water dispersion 1 obtained in Preparation Example 1, a comparative ink 2 was produced. The comparative ink 2 was evaluated for the gloss and the storage stability in the manners described above. The results are shown in Table 1.

TABLE 1

|  | Examples | | Comparative Examples | |
|---|---|---|---|---|
|  | 1 | 2 | 1 | 2 |
| Gloss | ◎ | ◎ | Δ | Δ |
| Storage Stability | ○ | ○ | X | Δ |

The water-based ink for ink-jet printing containing the polymeric dispersant of the invention exhibits an excellent storage stability. The images and characters printed on a glossy paper by using the water-based ink have a printed density sufficient for practical use and exhibit a high gloss.

What is claimed is:

1. A water dispersion for ink-jet printing comprising:
a polymeric dispersant,
water, and
a colorant,
wherein
the polymeric dispersant comprises a vinyl polymer,
the water dispersion is a dispersion comprising vinyl polymer particles comprising the colorant, the vinyl polymer particles being formed at least from the vinyl polymer and the colorant, and
the vinyl polymer has a constitutional unit represented by the following formula 1:

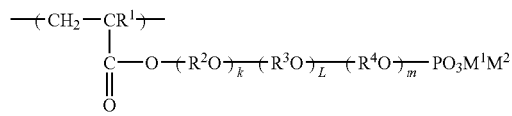
(1)

wherein $R^1$ is a hydrogen atom or a methyl group, $R^2$ and $R^4$ are the same and are an alkylene group having from 2 to 3 carbon atoms, $M^1$ and $M^2$ may be the same or different and are each independently a hydrogen atom or a cation, $R^3$ is an alkylene group having 4 carbon atoms, k and m are zero, and L is a number from 2 to 20.

2. A water dispersion for ink-jet printing comprising:
a polymeric dispersant,
water, and
a colorant,
wherein
the polymeric dispersant comprises a vinyl polymer,
the water dispersion is a dispersion comprising vinyl polymer particles comprising the colorant, the vinyl polymer particles being formed at least from the vinyl polymer and the colorant, and
the vinyl polymer has a constitutional unit represented by the following formula 1:

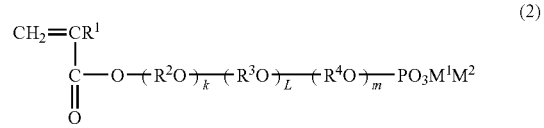
(2)

wherein $R^1$ is a hydrogen atom or a methyl group, $M^1$ and $M^2$ may be the same or different and are each independently a hydrogen atom or a cation, $R^2$ and $R^4$ are ethylene, $R^3$ is an alkylene group having 4 to 18 carbon atoms, k and m are the same and are a number from 1 to 2, and L is 1.

3. The water dispersion for ink-jet printing according to claim 1, wherein $R^2$ and $R^4$ are the same and are an alkylene group having 2 carbon atoms.

* * * * *

UNITED STATES PATENT AND TRADEMARK OFFICE
CERTIFICATE OF CORRECTION

PATENT NO. : 7,666,924 B2 Page 1 of 1
APPLICATION NO. : 11/149262
DATED : February 23, 2010
INVENTOR(S) : Takizawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 810 days.

Signed and Sealed this

Seventh Day of December, 2010

David J. Kappos
*Director of the United States Patent and Trademark Office*